UNITED STATES PATENT OFFICE 2,242,106

METHOD OF REMOVING BAKED ORGANIC COATINGS

Jacob F. Buckman, Hamden, Conn.

No Drawing. Application April 11, 1939,
Serial No. 267,352

2 Claims. (Cl. 141—1)

This invention relates to the removal of surface coatings, such as paint, varnish or enamels, and more particularly to the removal of baked organic coatings, such for example as those of the urea formaldehyde type, glycerine phthalic anhydride type or the resyl type from articles or objects made of the softer metals, such as aluminum, zinc, lead or magnesium or their alloys, or of plastic materials.

It is not difficult to remove baked organic coatings of this type from such metallic surfaces as steel, for example, as a stripping agent may be used which does not act upon the steel. The usual solutions used for this purpose, however, have the disadvantage that when used to remove such coatings from articles made of the softer metals the objects themselves are subjected to chemical attack, and also such solutions have the disadvantage of serving to disintegrate the organic coatings and deposit the filler upon the surface itself. The present invention contemplates the use of a solution as a stripping agent or enamel remover which will not attack chemically the softer metals or plastic substances, which does not disintegrate the coating, removing it without such disintegration and which substance is emulsified in water. The latter consideration is a very important one, as after the completion of the process herein described the articles from which the coating has been removed may merely be rinsed in water and are immediately ready for a further enameling or plating operation if this is to be done.

The material described herein may have as its primary active base cresylic acid, phenol itself, or derivatives of phenol such as orthocresol, metacresol or paracresol. Any of these substances are made emulsifiable in water by incorporating with them emulsifiers such as potassium oleate.

I have found that a highly desirable composition for use as a stripping material for the softer metals or plastic materials may be made up as follows: 10% to 80% cresylic acid, phenol or some derivative of phenol such as orthocresol, metacresol or paracresol; 2% to 20% of potassium oleate; 5% to 10% of water. In many instances the amount of potassium oleate in the above composition will preferably range from 5% to 10%.

There also may be added to the above composition a quantity of such solvents as hydrogenated naphtha or chlorinated organic compound, such as trichlorethylene. I have found that a very good material for this purpose is commercial "Solvesso" No. 2, although all "Solvessos" from numbers 1 to 4 are operative. It will be understood, however, that the addition of such a solvent is not absolutely essential but it has been found to result in a more rapid operation.

The quantity of this material employed may vary from 2% to 40% of the composition by volume.

Before use, the above is diluted in various concentrations with water. The amount of water to be added may vary greatly, for example, from one to forty parts of water to two parts of the mixture, the optimum being about three parts of water to one of the mixture. When the water is added an emulsion of the composition and water is obtained and as will be more particularly described hereinafter when the articles from which the enamel is to be stripped are immersed in the emulsified solution described, the enamel coating quickly loosens and is separated from the material, floating away in the solution.

In preparing a mixture of the material which I have found suitable I mix together about 65 pounds 10 ounces of oleic acid and 331 lbs. of cresylic acid, for instance, if the latter is to be the active stripping agent. Then a quantity of the hydrogenated naphtha solvent is added, such for example, as "Solvesso" No. 2 in an amount of from 225 to 240 pounds.

In a separate container are mixed approximately 17 pounds of water and 16 pounds of potassium hydroxide in order to procure a solution of the latter. This caustic solution is poured in the above described mixture of oleic acid, cresylic acid and the solvent, and the whole is thoroughly shaken or agitated to effect thorough chemical reaction between the potassium hydroxide and the oleic acid and effect thorough dispersion of the resulting potassium oleate in the cresylic and naphtha solution. The cresylic acid being a coupling agent aids in the dispersion.

When the above solution is to be used, water is added and as previously stated I prefer to add about three parts of water to one of the mixture described although the amount of water can be varied within wide limits. When the solution is thus diluted an emulsion of the mixture and water is secured and it is this emulsion of the composition and water that is peculiarly effective in the stripping operation.

The emulsion may be employed at any temperature between the freezing and boiling point of water, but it has been found that in general the higher the temperature the faster the action. When the temperature is above 150° F., however, some of the volatile solvents will be driven off too rapidly so that this temperature represents the maximum for the most advantageous results.

In carrying out the process of removing baked organic coatings by the composition above described, it is only necessary to immerse the articles to be stripped in the emulsion for a few minutes. The enamel or coating is loosened and removed, floating away from the articles; the latter may then be rinsed in either hot or cold water and, if desired, may be dried by any suitable means such as an air blast or oven or merely dried in the atmospheric air.

It may sometimes occur that the coatings which have been loosened may cling to the articles due to the film of water between them and the surface of the article, in a manner similar to that of a piece of wet paper clinging to a smooth surface. If desired, therefore, any particles of coating which so adhere after the rinsing operation may be removed by immersion in a hydrocarbon solvent, such as benzine or the commercial products "Varnolene" or "Varsol." This will displace the water between the film of enamel and the article and effect the separation of the two. After such treatment the articles may be blown dry or may be immersed in hot water and then dried in any usual way.

In the case of parts which may be suitably tumbled in a rotating barrel it has been found that a rapid stripping action is possible by using the emulsion of the composition and water heretofore described and tumbling the work in this mixture. In certain cases a solid material may be added to the contents of the barrel, such as pumice, leather scrap, sea sand, metal jacks or the like. This technique has been found helpful for small objects having recesses, fillets or other surface irregularities which might otherwise be difficult to reach.

It may be particularly noted that it is only necessary after the work is removed from its immersion in the emulsion to rinse it in water and permit it to dry without any actual cleaning operation or wiping. As this may be done, the articles may be carried directly from the rinsing operation into a following plating or enameling operation, for example.

It will be obvious to those skilled in the art that modifications may be made in the matter of preparations and in details of the procedure and that the invention is not to be limited to the precise preparation of materials or details described but is capable of modification and variation within the spirit of the invention and within the scope of the appended claims.

What I claim is:

1. The method of removing baked organic coatings which consists in immersing the work in an emulsion of water and a composition comprising, in volumetric proportions, 10% to 80% of a material selected from the group consisting of cresylic acid, phenol, orthocresol, metacresol and paracresol, 5% to 10% of potassium oleate, and 5% to 10% of water, the amount of water added to the composition being in the proportion of one to forty parts of water to two parts of the composition, the immersion being continued until the coating is loosened, and then removing the work from the bath and rinsing it in water.

2. The method set forth in claim 1, wherein the composition from which the emulsion is made comprises by volume 10% to 80% of a material selected from the group consisting of cresylic acid, phenol, orthocresol, metacresol and paracresol, 5% to 10% of potassium oleate, 5% to 10% of water, and 2% to 40% of a hydrogenated naphtha.

JACOB F. BUCKMAN.